(No Model.)

2 Sheets—Sheet 1.

H. HARDGROVE.
COMBINED THRASHER AND SEPARATOR.

No. 250,069. Patented Nov. 29, 1881.

WITNESSES
Fred. G. Dieterich.
P. E. Dieterich.

INVENTOR
Henry Hardgrove
by De Witt C. Allen, Attorney

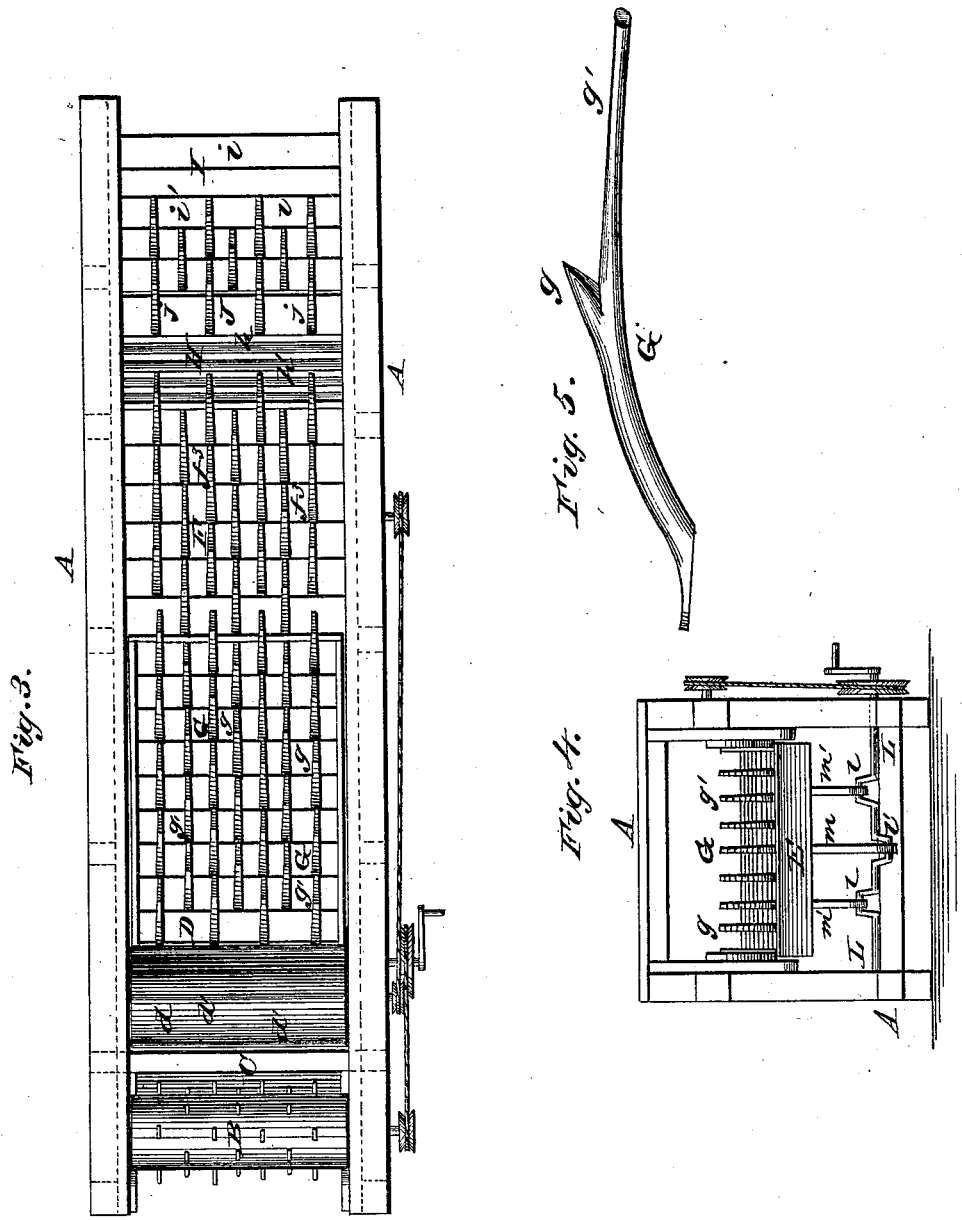

UNITED STATES PATENT OFFICE.

HENRY HARDGROVE, OF FOND DU LAC, WISCONSIN, ASSIGNOR TO McDONALD MANUFACTURING COMPANY, OF SAME PLACE.

COMBINED THRASHER AND SEPARATOR.

SPECIFICATION forming part of Letters Patent No. 250,069, dated November 29, 1881.

Application filed July 22, 1881. (No model.)

*To all whom it may concern:*

Be it known that I, HENRY HARDGROVE, a citizen of the United States, residing at Fond du Lac, in the county of Fond du Lac and State of Wisconsin, have invented certain new and useful Improvements in Combined Thrasher and Separator; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to certain new and useful improvements in the class of combined thrashers and separators, and more particularly to improvements in the beating and straw carrying and separating mechanism; and to this end the invention consists in novel features of construction and of combination and arrangement of parts, all as will be hereinafter fully described, and specifically designated in the claims.

Figure 1:
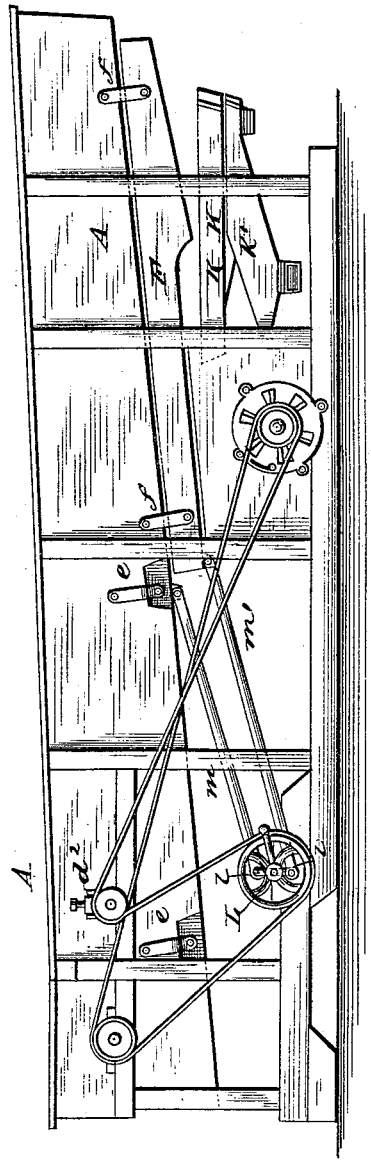
Figure 2:
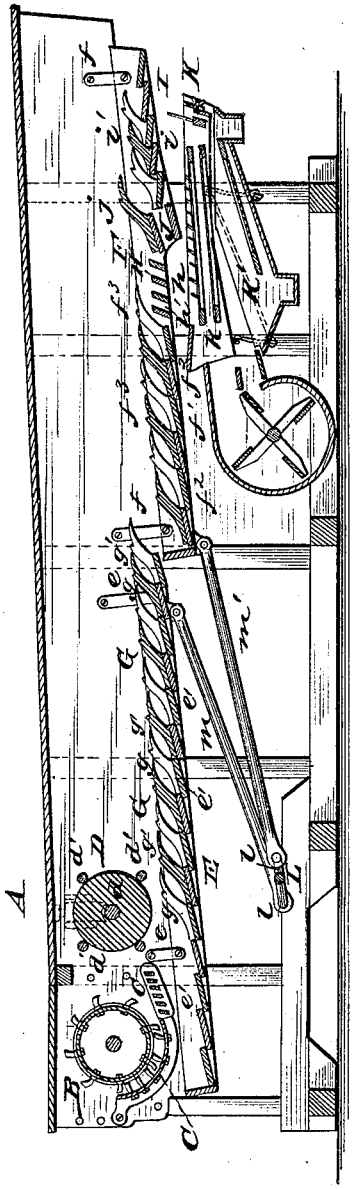

Referring to the accompanying drawings, Figure 1 represents a side elevation of my improved machine. Fig. 2 represents a longitudinal vertical section of the same. Fig. 3 represents a top view or plan. Fig. 4 represents a front-end view with the thrashing and beating mechanism removed. Fig. 5 represents an enlarged detail perspective of one of the straw-conveying forks or fingers.

In the drawings, A represents the general frame-work and inclosing-casing of the machine; B, the usual toothed thrashing-cylinder, and C the toothed concave.

D represents a beater arranged in rear of the thrashing-cylinder B, and which is composed of a smooth cylinder, $d$, having a series of longitudinal and round beating-rods, $d'$, secured upon its perimeter, and at equal distances apart. The ends of the axle, or journals, of the beater are mounted in adjustable bearings or boxes $d^2$, whereby said beater can be raised and lowered to suit the different kinds and conditions of grain to be thrashed, and thereby adapted to do more perfect work. By having the beating-rods made round and secured to the periphery of a smooth cylinder there is no danger of the straw clogging said cylinder, while the straw is not so easily broken up by the beating action, and is left in a better condition for subsequent use.

E represents a separating and straw-conveying pan, having its front end extending under the toothed concave C, so as to catch all of the grain therefrom. This pan is suspended near its front and rear ends from the casing of the machine by the bent pivoted side hangers, $e e$, and so as to form an inclined plane at an elevation of about twenty-five to thirty degrees. The bottom of the pan E is composed of transverse bars $e'$, each overlapping the next, as shown in Fig. 2, forming a serrated or corrugated bottom, and said bars are provided with straw-conveying forks or fingers G, notched or cut out, as shown in Figs. 2 and 5, to form teeth $g$, and rearwardly-projecting ends $g'$. These forks or fingers G extend rearward over and beyond the next succeeding bar, and they are so arranged as to come intermediate of or alternate with the forks or fingers of the succeeding bar.

F represents another separating and straw-conveying pan, arranged in rear of the pan E, with its front end extending under the rear end of said pan E. This pan F is suspended by pivoted hangers $f$ to form an inclined plane similar to pan E, and the front portion of the pan, to about midway of its length, is provided with a bottom, $f'$, composed of overlapping bars $f^2$, having forks or fingers $f^3$ similar to the bottom of pan E.

In rear of the bottom $f'$ of the pan F is arranged a slotted bottom, H, formed by the transverse inclined bars $h$, arranged a short distance apart to form transverse openings $h'$, through which the grain passes to the separating-shoe K. The bottom I, at the rear end of the pan F, is formed by overlapping transverse slats $i$, arranged reversely to the slats $f^2$, but provided with forks or fingers $i'$, extending rearwardly in a similar manner to the forks or fingers $f^3$; and intermediate of the slotted bottom H and bottom I is arranged an inclined transverse bar, J, having similar forks or fingers, $j$, leaving an opening, $j'$, for the passage to the separating-shoe of any grain that may be carried over on the bottom I.

L represents a transverse shaft arranged in bearings in the frame of the machine, and provided near its ends with cranks *l l* and a central crank, *l'*, arranged reversely to the cranks *l l*. The central crank, *l'*, is connected to the bottom of pan E, near the middle of the rear end thereof, by pivoted rod *m*, while the cranks *l l* are connected to the bottom of pan F, near the front end thereof, by pivoted rods *m' m'*, and through the medium of the cranks and connecting-rods and the pivoted hangers from which said pans are suspended they are adapted to receive reverse longitudinal vibrating or reciprocating and rising-and-falling movements, and through the medium of said movements and the construction of the pans the straw and grain are separated from each other and carried toward the rear of the machine, as will be hereinafter more fully described.

K represents the separating-shoe, arranged under the rear end of the separating-pan F, for receiving the grain, chaff, and other light impurities separated from the straw and passing through said pan. This shoe is divided into two sections, *k k'*, which are adapted to be vibrated (by any suitable means, or such as is shown in Patent No. 233,818) at right angles to each other, or the upper section vibrated longitudinally and the lower section transversely, so that the vibrations of the one section tend to break up or counteract the tremors of the frame of the machine set up by the regular and repeated shocks imparted by the vibrations or motions of the other.

The pans E F are so adjusted and balanced that there is no lost motion or waste of power, and for this reason they are adapted to be operated with less power and of lighter draft, while dispensing with the use of balance-wheels, and in connection with the divided separating-shoe a much steadier motion is given to the machine and with less wear and tear.

N represents the usual fan for producing a blast, by which the chaff and other light impurities separated from the grain by the usual arrangement of screens in said separating-shoe are blown or carried away. The several operating parts of the machine receive movements through the medium of an endless band passing over band wheels or pulleys mounted on the several shafts of the operating devices common to this class of machines.

The operation of my improved machine is as follows: The straw and grain, after passing between the thrashing-cylinder and concave, are subjected to a beating action by the revolving cylinder or beater D for the purpose of removing and separating any grain still connected to or in the straw, and which straw and grain are delivered into the pan E, the forks or fingers G holding the straw above, while the grain falls through onto the bottom thereof. The rising-and-falling movement, in connection with the longitudinal vibrating or reciprocating movement imparted to said pan and the form of bottom and forks or fingers, carries the straw and grain backward and delivers them respectively onto the forks or fingers and the corrugated or serrated bottom of the pan F, which receives similar movements to pan E, but in a reverse direction—as, for instance, when the pan E is moving forward and downward the pan F is moving rearward and upward; and, vice versa, as the pan E moves rearwardly and upwardly the pan F moves forwardly and downwardly. The straw and grain deposited onto the pan F are carried rearwardly in a similar manner as the straw and grain from pan E, the grain, when it reaches the slotted bottom H, falling through the same into the separating-shoe K, while the straw is discharged by the forks or fingers over the tail-end of the pan F out at the end of the machine. Any grain which may be carried over with the straw onto the bottom I will (by the reverse arrangement of the transverse overlapping bars forming said bottom and the reverse movements imparted to said pan) be carried forward and discharged into the separating-shoe K through the transverse opening *j'*.

The fingers G, having the notched and projecting ends, and their relative arrangement as before described, form a surface that will aid and permit the straw being effectually carried over them above the bottom of the pan without penetrating through the mass of straw, thus obviating defects incident to the class of machines using rods, which will penetrate through the straw and cause it to become lodged between the rods and pan.

I am aware that a separating-shoe divided into two sections and said sections adapted to be vibrated at right angles to each other is old, and such I do not wish to be understood as claiming, broadly, as of my invention.

Having thus fully described my invention, what I claim as new, and desire to secure by Letters Patent, is—

1. In a combined thrasher and separator, the combination, with the thrashing-cylinder and straw conveying and separating mechanism, of a beater arranged over the straw conveying and separating mechanism and in rear of the thrashing mechanism, said beater composed of a smooth cylinder having the round ribs secured on the periphery thereof, and the ends of the axle, or journals, of said beater arranged in adjustable bearings or boxes, substantially as and for the purposes herein shown and described.

2. In a combined thrasher and separator, the combination of the inclined separating and straw-conveying pan E, having a corrugated or serrated imperforate bottom, composed of transverse overlapping bars having rearwardly-projecting forks or fingers, the inclined separating and straw-conveying pan F, arranged in rear thereof, and mechanism, substantially as described, whereby said pans are adapted to receive rising-and-falling and longitudinally vibrating or reciprocating movements in opposite directions, substantially as and for the purposes specified.

3. In a combined thrasher and separator, the combination of the inclined separating and straw-conveying pan E, having a corrugated or serrated imperforate bottom, composed of transverse overlapping bars having rearwardly-projecting forks or fingers, the forks or fingers of each bar arranged intermediate of or alternating with the forks or fingers of the succeeding bars, and the inclined separating and straw-conveying pan F, arranged in rear thereof and adapted to receive the straw and grain from said pan E, substantially in the manner as and for the purpose herein shown and described.

4. In a combined thrasher and separator, the combination, with the separating and straw-conveying pan E and the separating-shoe K, of the separating and straw-conveying pan F, arranged in rear of pan E and over shoe K, and having a bottom the front portion of which is composed of overlapping bars having rearwardly-projecting forks or fingers, the rear portion composed of reversely-arranged overlapping bars having rearwardly-projecting forks or fingers, and an intermediate slotted portion, through which the grain passes, substantially in the manner as and for the purposes herein shown and described.

5. A separating and straw-conveying pan having a corrugated or serrated closed bottom and rows of rearwardly-projecting forks or fingers G, having teeth $g$ and rearwardly-projecting ends $g'$, substantially as and for the purpose herein shown and described.

6. A separating and straw-conveying pan having a corrugated or serrated bottom formed by overlapping bars having rearwardly-projecting forks or fingers, with teeth $g$ and rearwardly-projecting ends $g'$, the forks or fingers of each bar arranged intermediate of or alternating with the forks or fingers of each succeeding bar, substantially as and for the purpose specified.

In testimony whereof I affix my signature in presence of two witnesses.

HENRY HARDGROVE.

Witnesses:
JOHN SPENCE,
WILL. M. REYNOLDS.